United States Patent [19]

Marston

[11] 3,975,600

[45] Aug. 17, 1976

[54] TELEPHONE LINE SPLICING APPARATUS

[76] Inventor: Harvey J. Marston, 1532 Alturas Drive, Burlingame, Calif. 94010

[22] Filed: June 6, 1975

[21] Appl. No.: 584,693

[52] U.S. Cl............. 179/175.3 A; 179/175.25
[51] Int. Cl.² ................................... H04B 3/46
[58] Field of Search ........... 179/175.3 R, 175.3 A, 179/175.3 S, 175.25

[56] References Cited
UNITED STATES PATENTS

| | | | |
|---|---|---|---|
| 2,680,162 | 6/1954 | Brehm | 179/175.3 S |
| 3,252,088 | 5/1966 | Palmer | 179/175.3 A |
| 3,718,781 | 2/1973 | Angner | 179/175.3 S |
| 3,742,154 | 6/1973 | Bidlack | 179/175.3 S |

Primary Examiner—David L. Stewart
Attorney, Agent, or Firm—Owen, Wickersham & Erickson

[57] ABSTRACT

Highly portable apparatus enabling locating cutting and splicing of an active circuit communications pair extending between two locations without circuit interruption is disclosed. The apparatus includes a master unit at one of the locations connected to the pair to be spliced and an alternate pair extending between the locations. A remote unit at the other location is connected to the active pair and the alternate pair. A pair identification and connection verification circuit is included for verifying the interconnection of the master unit and the remote unit to the same active pair. Manually actuated switching circuitry is included in the master unit for connecting the alternate pair to the active pair and for generating a switching signal which is transmitted to the remote unit upon manual actuation of the switch in the master unit. Automatic switching circuitry in the remote unit connects the alternate pair to the active pair in response to the switching signal. A switch inhibit guard circuit is connected to the connection verification circuit to override the manual actuated switching circuit and the automatic switching circuit if the interconnection of the master unit and the remote unit to the same active pair is not verified.

11 Claims, 5 Drawing Figures

TELEPHONE LINE SPLICING APPARATUS

BACKGROUND OF THE INVENTION

The present invention relates to apparatus for diverting a communications path from a wire pair extending between two locations to an alternate wire pair extending between the same locations so that repair work such as splicing may be accomplished on the bypassed pair without interruption of, or interference with, the communications circuit.

In communications systems, and particularly in telephone carrier communications systems, multiconductor cables provide the signal paths forming the intercommunication network. Typically these cables are placed in underground conduits, are suspended aerially, or are directly buried in the soil. Regardless of the manner of installation, these cables tend to fail from time to time due to a variety of factors, such as exposure to moisture and moisture-induced electrolysis, exposure to chemicals which attack the insulation, exposure to fire, mechanical vibration, and to attack by rodents and other living things. Consequently, the cables must be repaired or replaced from time to time.

In telephone systems, the standard procedure followed heretofore has been removing the pair to be spliced or replaced from active service by appropriate bypass patching at terminal ends to transfer the circuit in question to another pair, accomplishing required testing, cutting, and splicing, checking the continuity of the repaired or replaced cable, and then returning the communications circuit to the original pair by removing the bypass patches at the terminal ends. This procedure has required the attention of at least four technicians: two at the terminal locations to accomplish the patching, and two at the ends of the cable section to be cut, spliced and returned to service.

Although test apparatus and techniques have been available to reroute temporarily a communications circuit away from a section of the cable to be cut and spliced so that uninterrupted communications service has been provided, the apparatus and techniques have not provided a fail-safe guard circuit ensuring that communications service will not be interrupted as a result of incorrect cutting and splicing procedures. Because of this omission, the apparatus has typically been frequently misconnected to the lines so that when they are cut, communications service is lost, with resultant loss of revenue and customer complaints to the communications or telephone utility. Such apparatus and techniques have proved to be particularly troublesome with respect to signal repeaters in carrier systems which have masked some test signals of the apparatus of the prior art by amplification of crosstalk, etc., so that verification of a true metallic bypass connection to the section to be cut and spliced has been difficult to accomplish.

The foregoing drawbacks, as well as others, are overcome by the present invention which will now be described.

SUMMARY OF THE INVENTION

It is therefore one object of the invention to provide apparatus enabling the cutting and splicing of a communications pair without interruption of the communication circuit on the pair.

Another object of the present invention is to remove the active circuit from the pair to be cut by automatically switching to an alternate pair.

A further object of the present invention is to provide communication line splicing apparatus including a guard circuit which automatically inhibits switching to an alternate pair in the event of a misconnection of the apparatus to the pair to be cut.

A still further object of the present invention is to provide a highly portable, completely self-contained communications line splicing apparatus that is inexpensive and uncomplicated to make and maintain and that is simple to operate.

Yet another object of the present invention is to provide a communications pair splicing apparatus that enables faster splicing methods than available in the prior art and that utilizes far fewer personnel to accomplish splicing without circuit interruption thereby resulting in savings of time and money to the utility and ultimately to the communications subscriber through lower rates.

These and other objects are accomplished by a communications pair splicing apparatus which enables cutting and splicing of an active circuit communications wire pair extending between two locations without circuit interruption by automatically switching the circuit onto an alternate communications pair to be cut and spliced. The apparatus includes a master unit at one of the locations connected to the pair to be cut and to the alternate pair, and it includes a remote unit at the other location connected to the active and alternate pair. An automatic connection verification circuit is included in the apparatus for verifying the interconnection of the master unit and the remote unit to the pair to be cut. After the pair is severed a manually actuated switch in the master unit connects the alternate pair to the active pair; and, at the moment of switching, the switch develops a remote unit switching signal. The remote unit includes an automatic switch for connecting the alternate pair to the active pair at the remote unit end in response to the switching signal. Thus, at the moment of switching the alternate pair is connected to the active pair to replace temporarily the segment of the active pair which is to be spliced, without circuit interruption and without disturbance to the impedance of the active pair. A guard circuit is included in the apparatus which overrides the manually actuated switch in the master unit and the automatic switch in the remote unit if the connection verification circuit indicates that the master unit and the remote unit are not correctly connected to the pair to be cut. A circuit monitor may also be provided in the master unit to monitor the communications circuit of the active pair during the repair operation.

DESCRIPTION OF A PREFERRED EMBODIMENT

Figure 1:
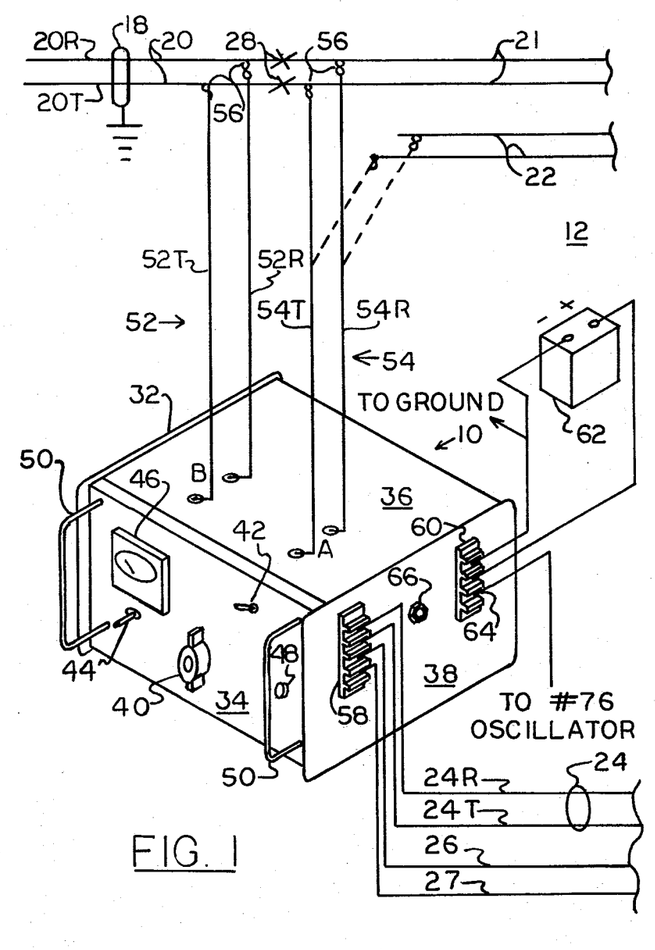
FIG. 1 is a somewhat diagrammatic view in perspective of the self-contained communications pair splicing apparatus of the present invention including a master unit at one location and a remote unit at another location. Each unit is connected to a line to be spliced and alternate and control lines extending between the two locations.

Apparatus of the present invention, as illustrated in FIG. 1, includes a master unit 10 at a first location 12 and a remote unit 14 at a second location 16. A carrier communication cable 18 includes a communications pair 20 having a tip wire 20T and a ring wire 20R. The pair 20 includes a section 21 between the locations 12 and 16 which is defective and which will be replaced by a replacement pair section 22 which also extends between the first location 12 and the second location 16. Other wires, including a bypass pair 24 and two control wires, a signal return wire 26, and a transfer control wire 27, also extend between the two locations 12 and 16.

In the particular application described herein the locations typically would be at places of cable splices such as manholes for underground cabling or aerial splicing points such as telephone poles for cabling extending above the ground. Of course, each or both locations could be central office termination locations, but that would not be a usual circumstance. In any event the communications pair 20 in the cable 18 will be severed at a point 28 at the first location 12 and at a point 30 at the second location 16 thereby separating the segment 21 therefrom. Then the replacement pair 22 will be spliced to the severed ends of the pair 20 to establish continuity of the pair 20 via the new segment 22.

The apparatus of the present invention enables the cutting and splicing operations described above to be carried out without a loss of, or interference with, the circuit continuity on the pair 20. This apparatus will now be described.

The Master Unit 10

The master unit 10 is contained in a sturdy box-like housing 32 which may be made of a metal sheet such as aluminum or steel. As the unit 10 is for rugged field usage, the housing 32 must be built to withstand rough handling including shocks induced by dropping and jarring, and still remain operable. The housing 32 includes, inter alia, a front panel 34, a top connection panel 36 and a side connection panel 38. As detailed in FIG. 4, the front panel includes a function switch 40 having five positions which are labeled Tone, Verify A, Verify B, Cut, and Test New, respectively. These positions will be explained in detail hereinafter. A line transfer control switch 42, a gain control 44, a circuit signal level meter 46, and a transfer indicator lamp 48 are also mounted in the front panel 34. Two handles 50 extend outwardly on both sides of the front panel 34 to provide convenient lifting points and to protect the controls and meter secured in the panel 34 from damage during rugged field usage.

The top connection panel 36 includes two pairs of connection leads: a first pair 52 called a "B cord" and a second pair 54 called an "A cord." Each pair includes a tip lead 52T, 54T and a ring lead 52R, 54R. The first lead pair 52 is connected to the pair 20 and the second lead pair 54 is connected to the segment 21 at the first location 12. Care is taken to be certain that tip leads do not become reversed with ring leads and that connections are made in accordance with traditional telephone practice. Suitable alligatortype fasteners 56 may be utilized at the ends of the lead pairs 52 and 54 to enable a positive and secure electrical connection thereof to the pairs 20 and 21.

The side connection panel 38 contains a bypass and control terminal strip 58 for connection to the bypass pair 24, the signal return wire 26, and the transfer control wire 27. A power supply terminal strip 60 for connection to a 24 volt direct current power source such as a battery 62 is also mounted on the side panel 38. This strip 60 may also include a terminal 64 for a tone input from an external sweep oscillator, such as a Western Electric Type No. 76 oscillator. A tone level adjustment potentiometer 66 is also mounted through the side panel 38.

Figure 2:
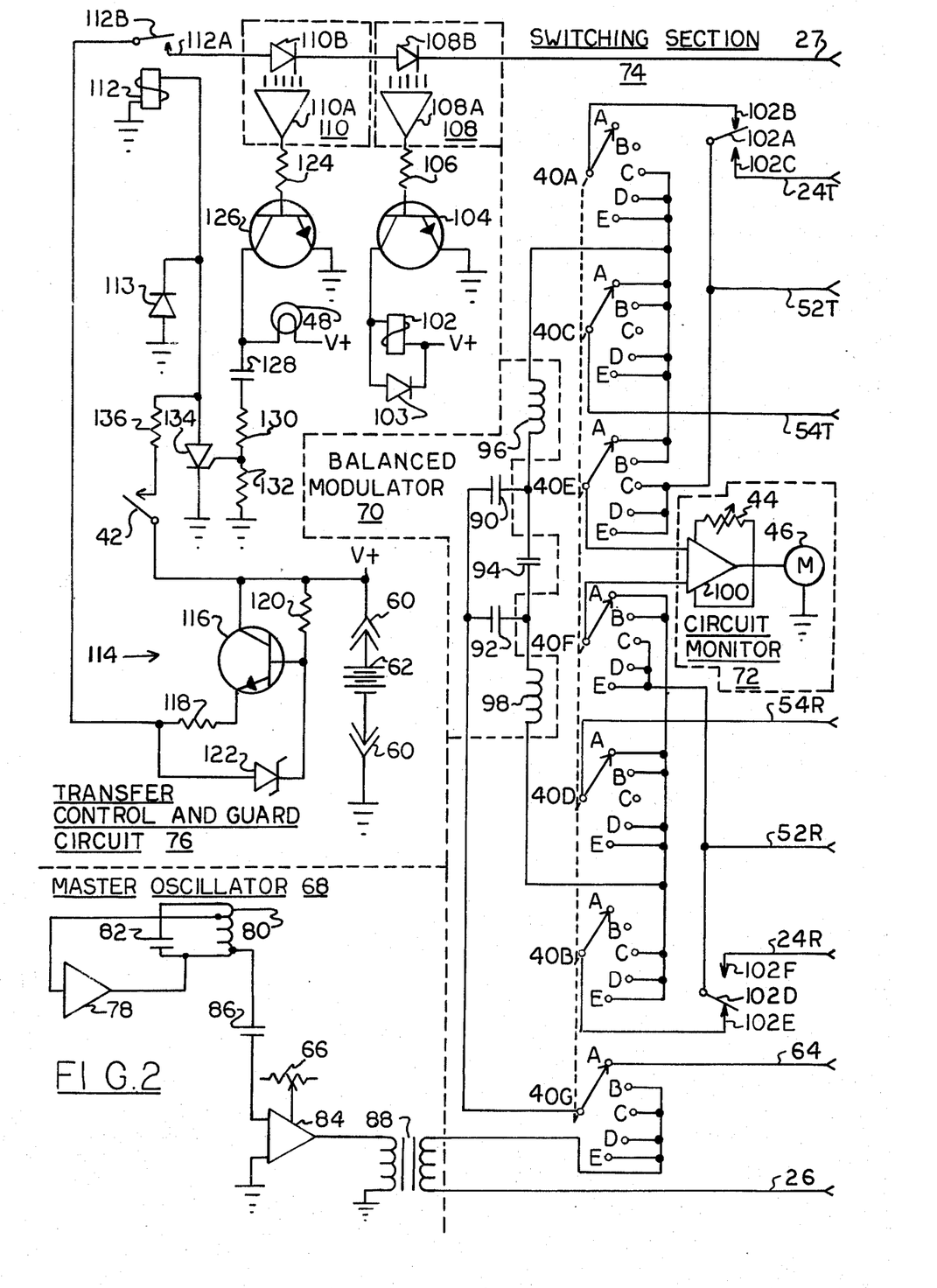
FIG. 2 is a schematic diagram of the circuitry of the master unit of FIG. 1 with section thereof divided by broken lines.

The circuitry of the master unit 10 is depicted by the schematic and block diagram of FIG. 2. The circuitry includes a master oscillator section 68, a balanced modulator section 70 for simplex signalling, a circuit monitor section 72 for driving the circuit level indicator meter 46, a switching section 74 and a transfer control and guard circuit 76.

The master oscillator section 68 includes a Hartley-connected audio oscillator stage including an amplifier 78 and a parallel resonant circuit of a tapped inductor 80 and capacitor 82. A nominal audio frequency (e.g. 1400hz) is generated by the oscillator stage. A controlled gain buffer amplifier 84 is connected to the output of the oscillator via a blocking capacitor 86. Gain of the buffer amplifier 84 is controlled by the tone level potentiometer 66 in the side panel 38. The output of the buffer is connected to a primary winding of an impedance matching and isolating transformer 88. A secondary winding of the transformer is connected on one side to the signal return wire 26 at the terminal strip 58 and on the other side to four stator contacts B,C,D and E of a section 40G of the function switch 40. The fifth stator contact A of the section 40G is connected to the external tone input terminal 64 of the terminal block 60, so that tone may be provided by the external oscillator.

The balance modulator section 70 includes capacitors 90 and 92 connected in parallel on one side to the rotor of the switch section 40G. On the other side the capacitors are connected across an insolating capacitor 94 which is series connected to two inductors 96 and 98. The other end of the inductor 96 is connected to four stator contacts A,B,D, and E of a switch section 40C, three stator contacts C,D and E of a section 40A, and two stator contacts A and B of a section 40E. In complementary fashion the other end of the inductor 98 is connected to four stator contacts A,B,D and E of a section 40D, three stator contacts C,D and E of a section 40B and two contacts A and B of a section 40F.

The circuit monitor section 72 monitors the communications circuit carried on the pair undergoing testing such as carrier level on a carrier circuit. The monitor section 72 includes a high gain wideband (to 10mhz) amplifier 100, the gain of which may be adjusted by rotation of the gain control 44 on the front panel 34. The amplifier 100 drives the circuit level indicator meter 46. Two inputs are provided in a balanced arrangement to the amplifier 100. One input is from a rotor contact of the section 40E and the other is from a rotor contact of the section 40F. The amplifier 100 is connected through the sections 40E and 40F to the active pair so that the technician at the master unit location 12 may continuously monitor voice, pulse, or carrier signals carried on the active pair.

The function switch 40 has seven sections 40A, 40B, 40C, 40D, 40E, 40F and 40G. There are five fixed contacts A,B,C,D and E for each switch position. The A contacts correspond to "Tone"; the B contacts correspond to "Verify A"; the C contacts correspond to "Verify B"; the D contacts correspond to "Cut"; and the E contacts correspond to "Test New".

The connection lead B cord 52 includes a tip lead 52T and a ring lead 52R for connection to the tip and ring wires of the pair 20. The tip lead 52T is internally connected to stator contacts C,D and E of the switch section 40E and to an armature contact 102A of a transfer relay 102 within the guard circuit 76. A fixed contact 102B is connected to a rotor contact of the section 40A and an opposite fixed contact 102C is connected to a tip wire 24T of the bypass pair 24 at the terminal block 58. The ring lead 52R is internally connected to stator contacts C,D and E of the switch section 40F and to another armature contact 102D of the relay 102. A fixed contact 102E is connected to a rotor contact of the section 40B, and an opposite fixed contact 102E is connected to a ring wire 24R of the 102F block 58.

The connection lead pair 54 includes a tip lead 54T connected internally to a rotor contact of the section 40C and a ring lead 54R connected internally to a rotor contact of the section 40D.

The transfer control and guard circuit section 76 in the master unit 10 includes the winding of the previously mentioned transfer relay 102. A shunt diode 103 limits transients on the winding which is energized by a circuit path from the plus voltage V+ line, through an NPN power switching transistor 104 to ground. The base of the transistor 104 is controlled, through a biasing resistor 106, by an optoelectronic transistor detector 108A of an optoelectronic device 108. The detector 108A is energized by light emissions from an optoelectronic light emitting diode (LED) 108B of the same device 108. When the detector 108A is energized by light from the LED 108B, the switching transistor 104 saturates or closes, and the transfer relay 102 becomes energized. The LED 108B of the device 108 is in series with the transfer control wire 27 (which is connected at the terminal block 58), an emitter portion 110B of another optoelectronic device 110, a fixed contact 112A, an armature contact 112B of a guard relay 112 and a constant current source 114. The constant current source includes a transistor 116 with its collector connected to the plus voltage bus V+ and its emitter connected through a current limiting resistor 118 to the armature contact 112B. The base of the transistor 116 is biased by a resistor 120 connected to V+ and a zener diode 122 connected to the armature contact 112B. The reverse breakdown voltage rating of the diode 122 is selected to provide a predetermined constant current within the ratings of the series connected light emitter sections 108B and 110B of the optoelectronic devices 108 and 110 in the master unit and an LED section 196A of an optoelectronic device 196 in the remote unit 14. The optoelectronic devices 108, 110 and 196 are utilized herein with the constant current source 114 to accommodate very long cable lengths on the order of ten thousand feet as well as shorter lengths.

The detector portion 110a of the optoelectronic device 110 provides a switching signal, through a resistor 124, to the base of a switching transistor 126. The collector and emitter of the switch 126 provide a circuit path in series with the transfer indicator lamp 48 between ground and V+. An RC charging network includes a capacitor 128 connected from the collector of the transistor 126 through a series resistor 130 to a shunt resistor 132 and the gate electrode of a silicon controlled rectifier (SCR) 134. The SCR 134, when energized, provides a shunt circuit path to ground the field winding of the guard relay 112 and open the contacts 112A and 112B. The SCR 134 becomes energized in the event that the transistor switch 126 opens which permits the capacitor 128 to charge to a voltage sufficient to trigger the SCR 134. The SCR 134 is only activated when an erroneous connection has occurred and the LED 110B has stopped emitting light. A current limiting resistor 136 is in series with V+, the line transfer control switch 42 and the winding of the guard relay 112. A shunt diode 113 is paralleled across the winding of the relay 112 to limit transients. In normal operation with correct connections of the A and B cords, when the line transfer control switch 42 is closed, the guard relay 112 is energized, and so then is the transfer relay 102, and also the transfer indicator lamp 48.

The Remote Unit 14

Referring again to FIG. 1, the remote unit 14 has a housing 140 quite similar to the housing 32 of the master unit 10. The housing 140 must be of sturdy construction to withstand rough handling likely to occur during use of the remote unit 14. The housing 140 includes a front control panel 142, a top connection panel 144 and a side connection panel 146.

Figures 3, 5:
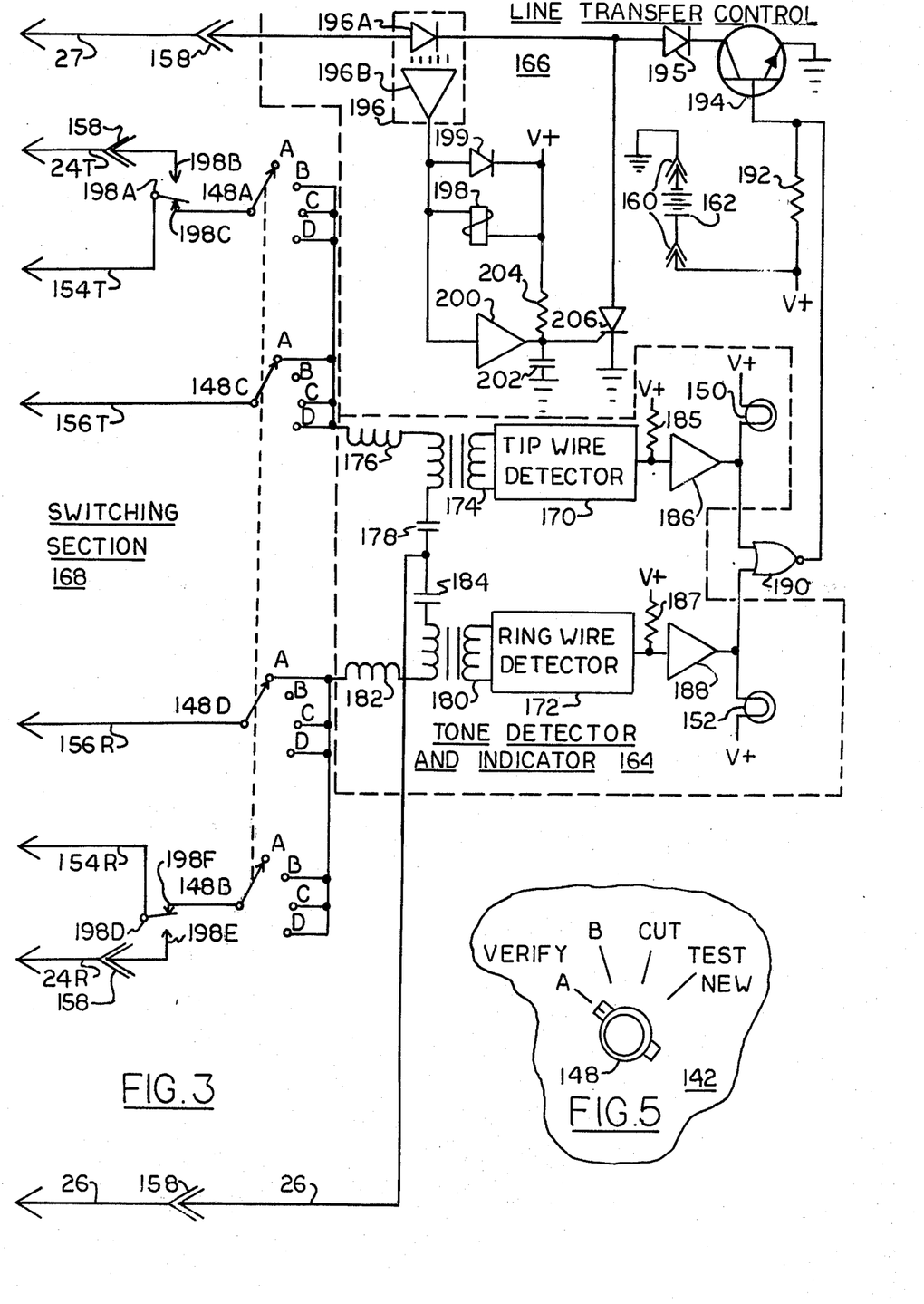
FIG. 3 is a schematic diagram of the circuitry of the remote unit of FIG. 1 with sections thereof divided by broken lines.
FIG. 5 is a partial view in front elevation of the front panel of the remote unit showing the various positions of the remote unit function switch.

A four position function switch 148 as detailed in FIG. 5 is mounted in the front control panel 142, the switch 148 has the following positions: "Verify A", "Verify B", "Cut", and "Test New". These positions correspond to the last four function switch positions of the master unit and will be explained later. Also mounted in the front panel are two indicator lamps: a tip wire indicator 150 and a ring wire indicator 152.

Two pairs of connection leads extend from the top connection panel 144, a first pair 154 called the "B cord" for connection to the pair 20 at the location 16, and a second pair 156 called the "A cord" for connection to the segment 21 at the same location. The B and A cords each have a tip wire 154T, 156T and a ring wire 154R, 156R. It is to be understood that the pair 20 will be cut at a point 30 at the remote location 16 to define the other end of the segment to be replaced 21, and that the pair 22 will then be spliced at the remote location 16 to the pair 20 to complete the replacement of the segment 21. Thus, the connection of the B cord leads 154 will be on one side of the cutting point 30, and, initially, the connection of the A cord leads 156 will be on the other side thereof. As with the leads 52 and 54 of the master unit 10, alligator clips 56 may be utilized at the ends of the connection pairs 154 and 156. The splicing sequence will be described hereinafter.

The side connection panel 146 contains two terminal blocks. A block 158 provides connections to the bypass pair 24, the signal return wire 26 and the transfer control wire 27 at the remote location 16. A block 160 provides connection to an external power supply such as a twenty four volt battery 162. A ground connection may also be provided at this block.

The circuitry of the remote unit 14 is disclosed in the schematic and block diagram of FIG. 3. There are three basic sections of the remote unit: a tone detector and indicator section 164, a line transfer control section 166, and a switching section 168.

There are two tone detectors: a tip wire detector 170 and a ring wire detector 172 within the tone detector section 164. Each tone detector 170, 172 detects the presence of the tone from the master unit arriving on a simplex signalling loop. Thus, the tip wire detector 170 receives a tone input from a transformer 174. The transformer 174 is in series with an inductor 176 and a capacitor 178 and forms a simplex signalling circuit path via the signal return bus 26, the tip wire T of either the pair to be replaced 21 or the remaining pair 20, depending upon the setting of the function switch 148, and the balance modulator 70 and switching circuitry 74 of the master unit 10 already described. Congruently, the ring wire detector 172 receives a tone input from a transformer 180. The transformer 180 is in series with an inductor 182 and a capacitor 184 and forms a simplex signalling circuit path via the signal return bus 26, the ring wire of either pair 21 or pair 20 depending on the function switch setting and the balance modulator 70 and switching circuitry 74 of the master unit 10. An output of the tip wire detector 170 drives the tip indicator lamp 150 through an inverter 186, and an output of the ring wire detector 172 drives the ring indicator lamps 152 through an inverter 188. Pull up resistors 185 and 187 are connected from V+ to the inputs of the inverters 186 and 188, respectively.

Referring now to the line transfer control section 166 of the remote unit 14, the outputs of the inverters 186 and 188 also provide inputs to a gate 190, which, in combination with a pull up resistor 192, controls the base of a transistor switch 194. The switch 194, when conducting, provides a connection to ground for the transfer control bus 27 in series with an isolation diode 195 and optoelectronic device 196. Transistor 194 is closed when tone is detected by the detectors 170 and 172. If either one or both of the detectors should stop receiving a tone when the transfer switch 42 is activated, then the gate 190 will open the transistor switch 194 which thereupon activates the guard circuit which overrides the transfer switch, thereby minimizing loss of circuit continuity.

When the transfer control bus 27 forms a complete circuit loop, an LED portion 196A of an optoelectronic device 196 activates a transistor detector portion 196B which energizes the winding of a remote line transfer relay 198. A shunt diode 199 is paralleled across the winding of the relay 198 to remove induced transients. An inverter 200 inverts the output of the optoelectronic detector 196B to provide a high level output which is applied to charge an RC network including a shunt capacitor 202 and a resistor 204 in series with the inverter output and V+. The inverter output is also applied to the gate of a silicon controlled rectifier 206 which is paralleled across the transistor switch 194 and functions to ground the transfer control bus 27 when the SCR is triggered. The values of the capacitor 202 and resistor 204 are selected to provide a trigger signal to the SCR 206 which occurs about fifty milliseconds after the optoelectronic device 196 has energized the transfer relay 198. The function of the SCR 206 is simply to override the guard circuit and ground the transfer control bus 27 following a sufficient, but short, time after the transfer relays 102 and 198 have switched in unison. The sufficient but short time, e.g. fifty milliseconds, is more than ample for the guard circuit 76 of the master unit 10 to release the relays 102 and 198 if a misconnection of a lead wire has been made. Thus, after 50 milliseconds the A cords of the master and remote units may be removed from the segment 21 and used to check the new segment 22.

The switching circuitry 168 of the remote unit 14 is straight forward. The four position function switch 148 has four sections 148A, 148B, 148C and 148D. There are four fixed contacts A, B, C and D for each position. The A contacts correspond to "Verify A", the B contacts correspond to "Verify B", the C contacts correspond to "Cut", and the D contacts correspond to "Test New".

A tip lead 154T of the B cord is connected to an armature contact 198A of the relay 198. A tip lead 24T of the bypass pair 24 is connected to a fixed contact 198B of the relay 198. A fixed contact 198C opposite contact 198B is connected to a rotor contact of a switch section 148A of the function switch 148. In complementary fashion a ring lead 154R of the B cord is connected to an armature contact 198D of the relay 198. A fixed contact 198E is connected to a ring lead 24R of the bypass pair 24. A fixed contact 198F opposite the contact 198E is connected to the rotor contact of a switch 148B. Three fixed contacts B, C and D of the switch section 148A are connected to three fixed contacts A, C and D of a section 148C. A rotor contact of the section 148C is connected to a tip lead 156T of the A cord, and a rotor contact of the section 148D is connected to a ring lead 156R of the A cord. The inductor 176 is connected to the fixed contacts A, C and D of the section 148C, and the inductor 182 is connected to the fixed contacts A, C and D of the section 148D.

Operation

Figure 4:
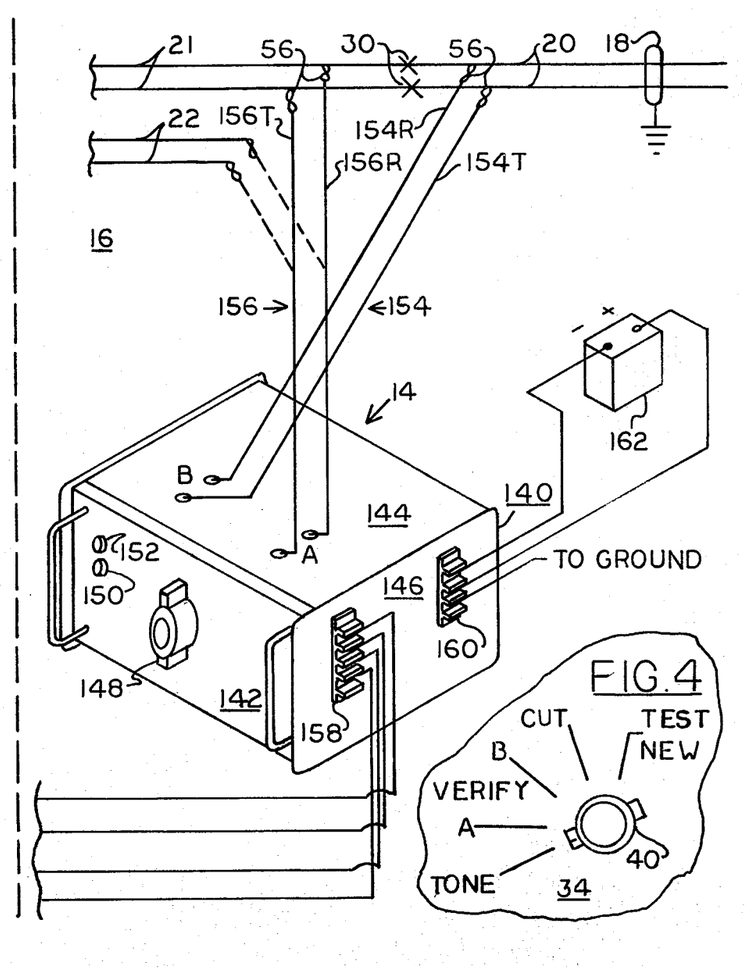
FIG. 4 is a partial view in front elevation of the front panel of the master unit showing the various positions of the master unit function switch.

As previously mentioned, the function switch 40 of the master unit 10 has five positions: Tone, Verify A, Verify B, Cut and Test New. The Tone position provides a path from an external sweep oscillator through the balanced modulator section 70 to the A cord connection wires 54T and 54R. The A cord 54 of the master unit may then be connected to the pair to be tested or replaced such as the segment pair 21. An inductive probe may be utilized at the remote location 16 to identify the other end of the segment 21. The A cord 156 of the remote unit may then be connected to the same segment 21.

Verify A

In the Verify A positions of the function switches 40 and 148, the connection of the tip and ring leads 54T and 54R of the A cord in the master unit 10 and the connection of the tip and ring leads 156T and 156R of the A cord of the remote unit 14 to the same pair is verified. The internal 1400 hertz audio tone frequency produced by the generator 68 is connected to the segment 21 through the balanced modulator 70 and switch section 40C and 40D. The return lead of the output winding of the transformer 88 is connected to the signal return bus 26. In the remote unit, the Verify A position of the function switch 148 provides a connection from the segment pair 21 through the A cord 156 to the input windings of the transformers 174 and 180 which are respectively connected to the tone detectors 170 and 172. A completed metallic circuit path is provided back to the master unit via the signal return bus 26. The tone detectors 170 and 172 are preset to operate only when the predetermined audio frequency from the internal oscillator 68 of the master unit 10 is supplied to the pair 21. Therefore, when both the master and remote instruments are connected to the same pair, the tone detectors 170 and 172 are activated in the remote unit 14 and the tip lamp indicator 150 and the ring lamp indicator 152 thereupon becomes illuminated indicating corrected connections of the A cords at the master and remote locations 12 and 16.

Verify B

In the Verify B position, the master unit function switch 40 establishes a metallic signal path from the tone generator 68 through the B cord connection pair 52 to the pair 20 which contains the segment 21 to be replaced. Similarly, in the remote unit 14, the function switch 148 connects the remote unit to receive the predetermined audio frequency via the B cord connection pair 154. As with the Verify A position, the indicator lamps of the remote unit illuminate when the B cords of both units are connected to the same pair.

Cut

In the Cut function switch position which is the fixed contact D of the sections 40A-G of the master unit, the A cord 54 of the master unit is connected internally to the B cord 52, and the A cord 156 of the remote unit is connected internally to the B cord 154. Thus, at the location 12 of the master unit, the pair 20 may be severed at point 28 without loss of continuity, and the pair 20 at the remote location 16 may be severed at location 30 without loss of continuity.

Operation of the Transfer Switch 42

With the function switches 40 and 148 in the "Cut" position, and after the tip and ring leads of the pair 20 are individually severed at point 28 at the first location 12 and are severed at point 30 at the second location 16, the now severed line 20 is in condition to be switched to the bypass pair 24 to provide virtually uninterrupted circuit continuity during splicing operation, as switching is completed in about one millisecond. This switching is accomplished by operating the transfer control switch 42 in the master unit, which operates the guard relay 112. The guard relay 112 establishes a closed circuit from the constant current source through the emitter section 110B of the optoelectronic device 110, the emitter section 108B of the optoelectronic device 108, the transfer control bus 27 and in the remote unit 14 the emitter element 196A of the optoelectronic device 196 and the transistor transfer control switch 194 to ground. When the relay 112 is energized, the LEDs 110B, 108B and 196A operate the detectors 110A, 108A and 196B. The detector 108A in the master unit 10 and detector 196B to the remote unit, provide a closed circuit to the windings of the transfer relays 102 and 198 which are then energized, and the tip and ring leads of the B cord 52 of the master unit and the tip and ring leads of the B cord 154 of the remote unit are automatically internally transferred to the bypass pair 24 at each location 12 and 16. The simplex metallic continuity paths through the A cords 54 and 156 is not distrubed upon activation of the transfer relays, although the circuit is switched off of the segment 21 to which the A cords are connected.

If at any time before or upon the actuation of the relays 102 and 198, tone is lost at either or both of the tone detectors 170 and 172, the gate 190 opens the transistor control switch 194 within about ten milliseconds which thereupon interrupts the circuit path on the transfer control bus. In this event a loss of emission from the emitter 110B turns off the photodetector 110A which provides a lock-out pulse through the differentiation network of capacitors 128 and resistors 130 and 132 to trigger the silicon controlled rectifier 134. When the SCR 134 conducts, it shunts the guard relay to ground to lock it out, which returns the circuit through the A cords to the segment 21. The transfer to the bypass pair 24 remains inhibited until the line transfer control switch 42 is opened, the connection of the A cords of the master and remote units are corrected and verified, and the line transfer control switch 42 is again closed. Transfer lockout is indicated at the master unit by no illumination of the transfer indicator lamp 48.

Assuming that a correct connection has been established for the A cords of the respective units, upon switching the transfer lamp indicator 48 becomes illuminated and stays illuminated, and, in the remote unit, capacitor 202 commences to charge to a value which will trigger a silicon control rectifier 206. After approximately 50 milliseconds of continuity of the transfer control bus 27, the rectifier 206 is triggered and shunts the transfer control switch 194. Thus, the A cords may then be removed from the segment to be replaced 21 and used for testing the replacement segment 22.

Test New

In the Test New position, the A cords of the master unit 10 and remote unit 14 are removed from the segment 21 and are connected to the new segment 22 which will be used to replace the old segment 21. In the Test New position, providing there is metallic continuity on the new pair 22 between the master unit location 12 and the remote location 16, the tip and ring indicator lamps 150 and 152 at the remote unit 14 will operate in the manner previously described.

Once continuity of the new pair 22 is established, along with the identity of the tip wire and ring wire of the pair, the circuit is transferred from the alternate pair 24 to the new segment pair 22 in the A cords by opening the transfer control switch 42. In the Test New function switch position which is the fixed contact E of the Section 40A-G of the master unit 10 and contact D of the section 148-C of the remote unit 14, metallic continuity is established between the new segment pair 22 and the existing pair 20. At both the master and remote location the tip wire of the segment 22 is then spliced to the tip wire of the pair 20 and the ring wire of the pair 22 is then spliced to the ring wire of the pair 20. When the splices are completed, the clips 56 may be removed from the pair 20 and the pair 22, and the splicing operation for the pair 20 is now completed and the next pair to be cut and spliced may be handled repeating the sequence just described.

Operation of Master Unit Circuit Monitor

The circuit monitor 72 of the master unit 10 provides a continuous visual indication of any communications circuit appearing on the active pair 20. In the Tone and Verify A positions, the indicator meter 46 indicates the level of a carrier, or pulse or voice signals appearing on the pair to which the master unit A cord 54 is connected. In the Verify B, Cut and Test New positions, the meter 46 indicates the level of a carrier, or pulse or voice signals appearing on the pair to which the master unit B cord is connected. The circuit monitor provides a further safeguard against a loss of circuit continuity which is of primary importance to the communications industry.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. Apparatus enabling locating, cutting and splicing of an active circuit communications pair extending between two locations comprising is combination:
   a master unit at one of the locations having external connecting wires to said pair to be spliced and to an alternate pair extending between the locations;
   a remote unit at the other of the locations having external connecting wires to said pair to be spliced onto said alternate pair;
   connection verification means in said master unit and said remote unit for verifying a correct interconnection of said remote unit to said master unit via said pair to be spliced without interference to said active circuit on said pair to be spliced;
   switching means in said master unit for switching said active circuit to said alternate pair at said first location, and for transmitting a switching signal to said remote unit;
   automatic switching means in said remote unit for switching said active circuit to said alternate pair at said other location in response to said switching signal;
   guard circuit means automatically responsive to said interconnection verification means for overriding said switching means and said automatic switching means if verification of said interconnection between said master unit and said remote unit ceases upon actuation of said switching means.

2. The apparatus as set forth in claim 1 wherein:
   said external connecting wires from said master unit to said pair to be spliced include two connecting wires to a tip wire of said pair and two connecting wires to a ring wire of said pair, and said switching means in said master unit provides one switchable path between said two wires to said tip wire and another switchable path between said two wires to said ring wire;
   said external connecting wires from said remote unit to said pair to be spliced include two connecting wires to said tip wire and two connecting wires to said ring wire, and said automatic switching means in said remote unit provides one switchable path between said two wires to said tip wire and another switchable path between said two wires to said ring wire,
   whereby said pair to be spliced may be cut at each location at points between the two wires connected to each of the tip and ring wires without loss of circuit continuity, and whereby after cutting is completed at each location the active circuit may be switched from the severed segment of the active pair to said alternate pair without substantially varying the impedance of said active pair.

3. The apparatus as set forth in claim 1 wherein said connection verification means includes means for generating a verification signal and means for applying said signal to said tip or ring wire of said pair to be spliced at one of said locations, and means for detecting said signal at the other of said locations including means for indicating the detection thereof.

4. The apparatus as set forth in claim 3 additionally comprising a verification signal return path between said locations connected to said connected verification means in a way that provides a simplexed circuit between said tip or ring wire and said signal return path.

5. The apparatus as set forth in claim 3 comprising two independent connection verification means: one means for verifying connections to said tip wire and the other means for verifying connections to said ring wire.

6. The apparatus as set forth in claim 1 additionally comprising circuit level monitor means at at least one of said locations for indicating the presence of communications signals on said active circuit communications pair.

7. The apparatus as set forth in claim 1 wherein said switching means and said automatic switching means includes relays having switching speeds generally on the order of a millisecond.

8. The apparatus as set forth in claim 1 additionally comprising lockout means connected to said guard circuit means for disablement thereof at a predetermined time after switching upon verification of connections following said switching.

9. Highly portable apparatus providing circuit continuity and testing of an active circuit communications pair extending between two locations which is undergoing splicing in combination with an alternate pair between said location, including in combination:
   a master unit at one of the locations having two pairs of connecting wires for connection to said pair to be spliced on each side of the cut to be made therein, a tone oscillator in said master unit for providing a test tone, a balanced modulator in said master unit for applying said tone in a balanced simplex circuit to a tip wire and to a ring wire of said communications pair, a transfer control circuit and a guard circuit in said master unit for switching said circuit from said active pair to said alternate pair and for sending a transfer signal to a remote unit;
   a remote unit at the other of the locations having two pairs of connecting wires for connection to said pair to be spliced on each side of the cut to be made therein, two tone detectors in said remote unit, one said detector for detecting test tone on the simplex circuit of said tip wire and the other said detector for detecting test tone on the simplex circuit of said ring wire, each said tone detector providing a visual indication at said remote unit when test tone is detected; a line transfer control circuit in said remote unit operating in response to said transfer signal to switch said circuit from said active pair to said alternate pair and for transmitting a guard circuit activation signal to said guard circuit in said master unit if test tone on either or both of said tip or ring wires ceases to be detected immediately following switching to said alternate pair, said guard circuit in said master unit disabling said transfer control circuit from continuation of switching and thereby returning said active circuit to said pair to be spliced upon detection of said guard circuit activation signal.

10. The apparatus of claim 9 additionally comprising a guard circuit lockout circuit which automatically disables said guard circuit when a predetermined period of time has elapsed subsequent to switching providing test tone continues to be detected thereafter by both said detectors.

11. The apparatus of claim 9 additionally comprising a circuit level monitor in at least one of said master unit remote unit for indicating the presence of communications signals on said active circuit communications pair.

* * * * *